May 21, 1929.  W. MERTÉ  1,713,708
PHOTOGRAPHIC OBJECTIVE
Filed Aug. 13, 1921
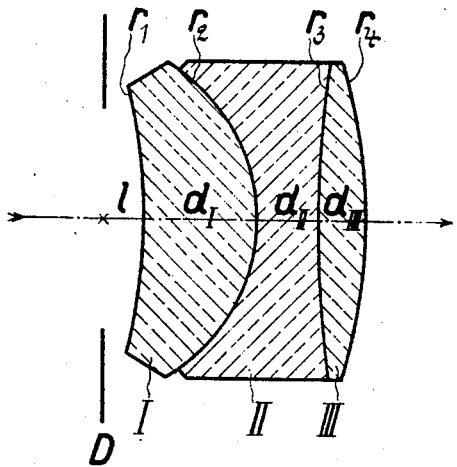
RADII, DISTANCE OF DIAPHRAGM AND THICKNESSES
$r_1 = -21.15$  $l = 1.61$
$r_2 = -7.11$  $d_I = 4.53$
$r_3 = +46.39$  $d_{II} = 2.51$
$r_4 = -20.83$  $d_{III} = 1.85$
KINDS OF GLASS
| | $n_D$ | $\nu$ |
|---|---|---|
| I | 1.4986 | 65.4 |
| II | 1.5199 | 54.5 |
| III | 1.6243 | 56.7 |
FOCAL LENGTH 100
Inventor:
Willy Merté

Patented May 21, 1929.

1,713,708

UNITED STATES PATENT OFFICE.

WILLY MERTÉ, OF JENA, GERMANY, ASSIGNOR TO THE FIRM OF CARL ZEISS, OF JENA, GERMANY.

PHOTOGRAPHIC OBJECTIVE.

Application filed August 13, 1921, Serial No. 492,148, and in Germany July 12, 1920.

(GRANTED UNDER THE PROVISIONS OF THE ACT OF MARCH 3, 1921, 41 STAT. L., 1313.)

The present invention consists in an improvement of those well-known photographic, i. e. spherically and astigmatically corrected objectives, composed of three lenses cemented together, the first of which is a positive meniscus, the second biconcave and the third biconvex and the refractive indices of which increase successively. The invention substantially consists in so selecting in these objectives the radii of the two outer lens surfaces as to be at least equal to one-sixth of the total focal length of the cemented system and the meniscus of which objectives has in its middle a thickness which is not smaller than the arithmetical mean of the thickness in the middle of the two other lenses. By the invention objectives may be obtained which are equivalent to uncemented systems of the same rapidity with regard to the spherical and the astigmatic correction. In addition, the new objectives may be superior to the above named uncemented ones with reference to greater sharpness of depth and brilliancy of the pictures taken, their relative aperture with like rapidity being smaller than that of the uncemented systems.

As an example the annexed drawing and the tables below indicate an objective corresponding to the invention which is destined to be chiefly used as a symmetrical double objective along with a second, uniform system. The relative aperture of the system shown is 1:9,5. The numerical values of the radii of curvature $r$, the thicknesses of lenses $d$ and the distance $l$ of the vertex between the first lens surface and the diaphragm D hold good for the focal length 100. The kinds of glass are characterized by the refractive indices $n_D$ and the reciprocal dispersive powers $v$.

Radii, distance of diaphragm and thicknesses.

$r_1 = -21.15$  $l = 1.61$
$r_2 = - 7.11$  $d_I = 4.53$
$r_3 = +46.39$  $d_{II} = 2.51$
$r_4 = -20.83$  $d_{III} = 1.85$

Kinds of glass.

|     | $n_D$  | $v$  |
| --- | ------ | ---- |
| I   | 1,4986 | 65,4 |
| II  | 1,5199 | 54,5 |
| III | 1,6243 | 56,7 |

Focal length, 100

I claim:

1. Photographic objective, comprising three lenses cemented together, the first of these lenses being a positive meniscus, the second biconcave and the third biconvex, the refractive indices of the said lenses increasing successively, the radii of the two outer lens surfaces of the said objective amounting to at least one-sixth of its focal length, and the thickness in the middle of the meniscus not being smaller than the arithmetical mean of the thickness in the middle of the two other lenses.

2. In a double objective two components consisting each of three lenses cemented together, in each component the lens facing the diaphragm being a positive meniscus, the next lens being biconcave and the third biconvex, the refractive indices of these lenses increasing successively from the first named to the third, the radii of the two outer lens surfaces of this component amounting to at least one-sixth of the focal length of this component, and the thickness in the middle of the meniscus not being smaller than the arithmetical mean of the thickness in the middle of the two other lenses.

WILLY MERTÉ.